G. L. BANKS.
TRACTOR WHEEL.
APPLICATION FILED NOV. 22, 1919.

1,382,815.

Patented June 28, 1921.

INVENTOR.
GEORGE L. BANKS.
BY Hazard & Miller
ATTORNEYS.

UNITED STATES PATENT OFFICE.

GEORGE L. BANKS, OF HUNTINGTON PARK, CALIFORNIA.

TRACTOR-WHEEL.

1,382,815. Specification of Letters Patent. Patented June 28, 1921.

Application filed November 22, 1919. Serial No. 339,976.

*To all whom it may concern:*

Be it known that I, George L. Banks, a citizen of the United States, residing at Huntington Park, in the county of Los Angeles and State of California, have invented new and useful Improvements in Tractor-Wheels, of which the following is a specification.

This invention relates to improvements in wheels for vehicles and more particularly to improvements in detachable traction members and has for its object to provide a substantial, inexpensive, simple, practicable and durable attachment that can be readily applied to traction wheel rims of given sizes and also to provide for the ready removal or replacement of elements that may become injured or unduly worn at slight expense and the invention consists of the construction and details an embodiment of which is illustrated in the accompanying drawing and disclosed and claimed herein.

Figures 1, 2, 3:
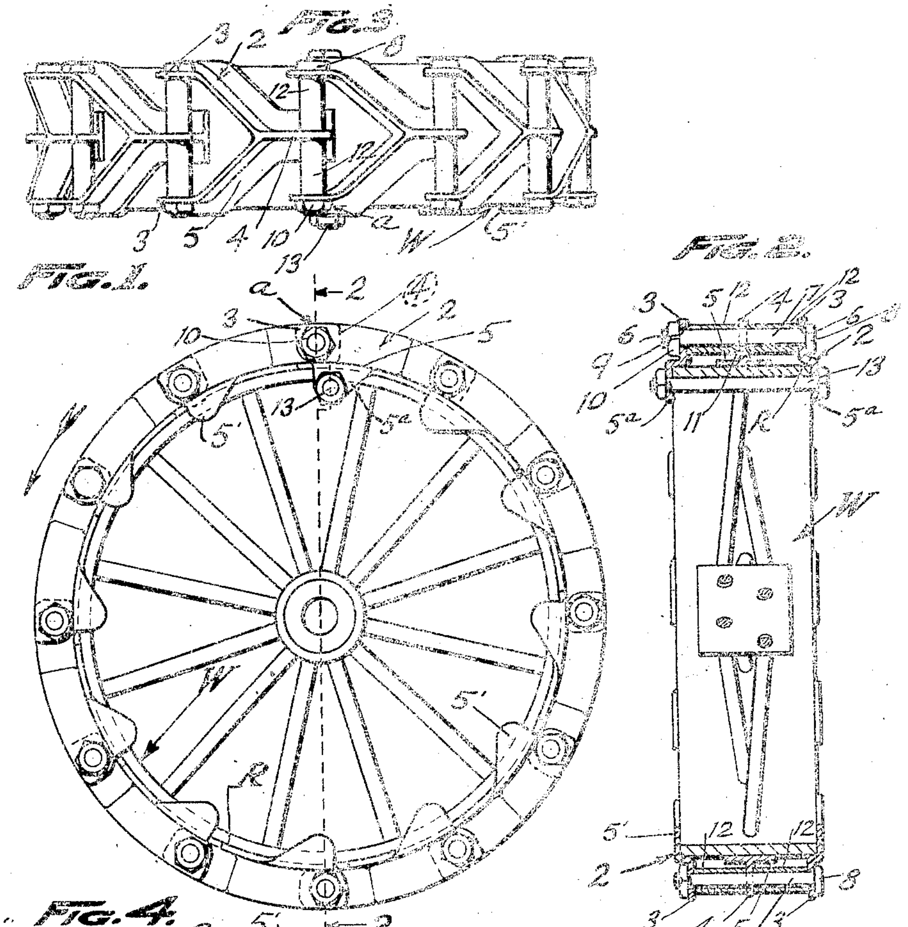
Figure 1 is a side elevation of a wheel showing a detachable tread secured thereto.
Fig. 2 is a transverse section on line 2, 2 of Fig. 1.
Fig. 3 is a plan view of the wheel shown in Fig. 1.

One of the important objects of the present invention is to provide a detachable traction tread made up of a series of duplicate and interchangeable link members and fastening means so that the several parts can be prepared, assembled and replaced at small expense and with facility and as shown the tread comprises a series of substantially duplicate link members 2 of substantially Y shape in plan thus forming a pair of oppositely spaced ears 3—3 and a central rearwardly extending part 4. The links 2 may be cast integrally of one piece or otherwise suitably formed and as shown in edge view are provided with a base portion 5 in the form of a lateral flange extending from the upright body portion 3—4 which is in the form of an upright flange or web. The base 5 of a link is made of arcuate form to conform to the peripheral face of the rim R of a given wheel W. Also the width of the arms 3—3 is such as to agree approximately or appropriately to the width of the rim R of the wheel thus enabling the diverse ends 5′ of the base 5 to be over lapped over the side edges of the rim R to prevent lateral shifting of the tread members when applied.

Figure 4:
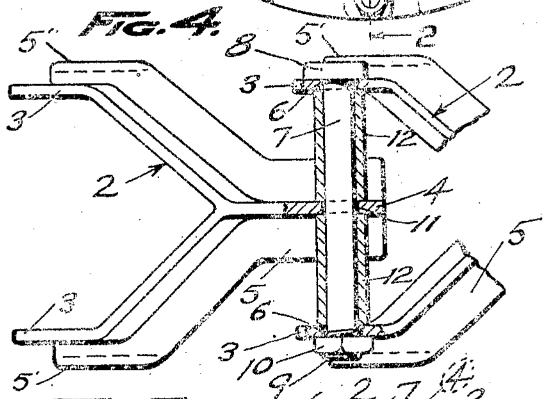
Fig. 4 is a perspective showing in detail, a portion of the detachable tread parts being in section.
Figure 5:
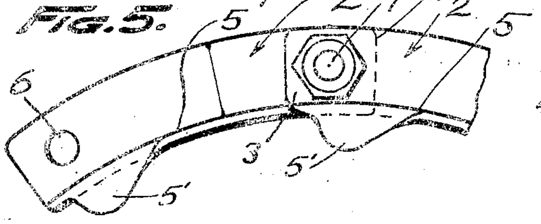
Fig. 5 is an edge view of the parts shown in Fig. 4.

The opposite ends 3—3 of a link 2 are perforated as at 6—6 of Fig. 4, the apertures being in alinement and adapted to receive a fastening bolt or pin 7, the head 8 of which may bear against the outer face of one arm or end 3 and the opposite end of the bolt 7 is threaded as at 9 to receive a nut 10 that can be turned up against the adjacent face of its respective arm 3 of a link. The bolt 7 is designed to pass through an aperture 11 formed in the upwardly extending web 4 at the rear end of the link. The rear end of the link 2 is designed to be held centrally between the next following pair of arms 3—3 of the adjacent link 2 as by means of a pair of spacing sleeves 12 one of which sleeves is placed on each side of the part 4 of a link and the bolt 7 is passed through the sleeves and the links, the outer ends of the sleeves being abutted against the inner faces of the arms 3—3 when the bolt 8 is tightened up.

The chain formed of links thus constructed can readily be applied to the wheel W in any suitable manner as for instance positioning one end of the chain as required on the rim R and the first link or end of the chain applied can if desired be provided with a fastening bolt 13 Figs. 1 and 2 that may be passed through downwardly turned and perforated ears $5^a$ so that after the first link has been applied and tightened into position on the rim R the wheel may then be rotated as in the direction of the arrow Fig. 1 until the entire chain or flexible tread has been mounted around the rim and then the last or a connecting bolt as at *a* can be passed through and the securement of the chain tread completed.

From the above it will be seen that I have provided not only a very simple and inexpensively maintained flexible detachable tread but further have provided one having a high degree of tractive efficiency.

Various changes may be made without departing from the spirit of my invention as claimed.

I claim:

1. A detachable tread for a wheel rim, comprising a length of chain having a series of Y-shaped links, and detachable means for connecting one link with the next, said means including cross bolts having spacers on each side of the central end of each link.

2. A detachable tread for a wheel rim, comprising a chain composed of substantially Y-shaped links, bolts passing through the extremities of the divergent portions and the central portion of contiguous links, and spacers on each link.

3. A detachable tread for a wheel rim, comprising a chain composed of substantially Y-shaped arcuate links, of substantially L-shaped cross section, bolts passing through the extremities of the divergent portions and the central portion of contiguous links, and spacers on each link.

4. A detachable tread for a wheel rim, comprising a chain composed of substantially Y-shaped arcuate links, said links being substantially L-shaped in cross section, forming horizontal bearing treads and vertical traction treads, parallel ears extending inwardly from and at right angles to the extremities of the divergent portions, and detachable means for connecting the links, comprising bolts passing through the extremities of the divergent portions and the central portion of contiguous links, and spacers on each link.

5. A detachable tread for a wheel rim, comprising a chain composed of links having a central portion and divergent portions extending therefrom, forming substantially Y-shaped arcuate members, said members being substantially L-shaped in cross section to form horizontal bearing treads and vertical traction treads, the outer extremities of the divergent portions being bent parallel with the central portion, co-axial perforations in the parallel portions of the traction treads, a perforation in the traction tread of the central portion, detachable means for connecting the links, comprising cross bolts passing through the perforations of the divergent portions and the central portion of contiguous links and having spacers on each side of said central portion, and ears extending inwardly from the bearing treads adjacent their parallel portions.

In testimony whereof I have signed my name to this specification.

GEORGE L. BANKS.